US006281152B1

(12) United States Patent
Mifune et al.

(10) Patent No.: US 6,281,152 B1
(45) Date of Patent: Aug. 28, 2001

(54) SHIELDING COAT MEMBRANE FOR DISCHARGE LAMP AND MANUFACTURING PROCESS THEREOF

(75) Inventors: Tatsuo Mifune, Katano; Masaru Ikeda, Sakai, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/332,907

(22) Filed: Jun. 15, 1999

(30) Foreign Application Priority Data

Jun. 15, 1998 (JP) .............................................. P10-166646

(51) Int. Cl.[7] ...................................................... C03C 27/00

(52) U.S. Cl. ................................ 501/32; 501/17; 501/21; 313/117; 427/165; 427/162; 427/376.2; 427/397.7; 106/287.34

(58) Field of Search ............................ 318/117; 427/165, 427/162, 376.2, 397.7; 501/32, 17, 21; 106/287.34, 459, 460, 457, 482, 489

(56) References Cited

U.S. PATENT DOCUMENTS 5,421,877 * 6/1995 Hayakawa et al. .................. 106/453
6,015,592 * 1/2000 Mifune et al. .................... 427/376.2

FOREIGN PATENT DOCUMENTS

797238 * 9/1997 (EP) .
0797238 9/1997 (EP) .
96/15548 5/1996 (WO) .

* cited by examiner

*Primary Examiner*—C. Melissa Koslow
(74) *Attorney, Agent, or Firm*—Wenderoth, Lind & Ponack, L.L.P.

(57) ABSTRACT

A conventional black oxide colorant used for the shielding coat membrane of the D2R type discharge lamps for automobiles has a problem that its wettablity with the granulated glass is not good so that a strong membrane is difficult to be obtained.

A paint for the shielding coat membrane comprises polycrystalline silica and Mn-doped ferric oxide as a black colorant, which has a good wettability with the granulated glass and a shielding characteristics so as to improve the membrane strength, thereby providing a lamp with the shielding coat membrane that passes all evaluation test in the view point of the membrane strength, the light transmissivity, the discoloration, the suppression of pealing-off and cracking.

15 Claims, 1 Drawing Sheet

SHIELDING COAT MEMBRANE FOR DISCHARGE LAMP AND MANUFACTURING PROCESS THEREOF

BACKGROUND OF THE INVENTION

1. Field of the Invention

The present invention relates to a paint of a shielding coat membrane and a lamp with the shielding coat membrane used for a high luminance discharge lamp of automobiles.

2. Description of the Related Art

Used for a high luminance discharge lamp for headlights of automobiles, it is necessary to form a black shielding coat membrane with an arbitrary shape on a glass surface of the lamp for contrasting light and shade in the projecting area.

FIG. 1 shows a structure of the discharge lamp of the D2R type automobiles. Numeral 1 of FIG. 1 denotes a shielding coat membrane of which position and size are determined by the international standard. Numerals 2*a*, 2*b* denote electrodes made of tungsten in which the discharging emission is generated when the electrodes 2*a*, 2*b* are applied with an external voltage so that the lamp glows. Numeral 4 denotes an outer tube made of quartz glass. The shielding coat membrane 1 is formed on the surface of the outer tube 4. Numeral 5 denotes an emission tube melted and fixed with the emission tube 5 at a portion 6.

According to the conventional manufacturing process, first the outer tube 4 is melted and fixed with the emission tube 5 with a heating treatment by a gas burner. And the paint for the shielding coat membrane which is made of a black colorant of transition metal elements such as ferric oxide, copper oxide, and cobalt oxide, and also made of a binder of granulated glass is painted on the surface of the lamp. Then the lamp is sintered in the electric furnace at the temperature that the granulated glass is melted so that the desired shielding coat membrane is provided.

As the temperature at the glass surface of the lamp increases when the discharge lamp glows, the temperature of the shielding coat membrane formed on the glass also increases. Especially as for the discharge lamp of the D2R type automobiles, the temperature at the glass surface of the lamp increases up to 700° C., therefore the shielding coat on the glass surface is also exposed under the temperature of 700° C.

For the above reason, it is necessary to sinter the conventional lamp at the temperature more than 700° C.

While the granulated glass is conventionally used for the binder as described, the melting granulated glass does not have a good wettability with the above mentioned black oxide colorant. Thus the granulated glass does not perform as the binder to bind the black oxide colorants one another so that the robust membrane is difficult to be obtained and the cracks sometimes occur thereon.

Therefore it is desired for the shielding coat material which has good membrane strength and no crack.

SUMMARY OF THE INVENTION

To solve the problem, the paint of the shielding coat membrane for the discharge lamp according to the present invention comprises polycrystalline silica, Mn-doped ferric oxide, and granulated glass mostly made of silica.

And the above mentioned paint is painted on the surface of the lamp and sintered so that the lamp with the shielding coat membrane according to the present invention is provided.

Further a process for manufacturing the lamp with the shielding coat membrane according to the present invention comprises steps of painting a paint for the shielding coat which includes polycrystalline silica, Mn-doped ferric oxide, and granulated glass mostly made of silica, on the lamp surface, and sintering so as to form the shielding coat membrane.

The shielding coat membrane according to the present invention is provided such that the membrane has good membrane strength thereby suppressing pealing off, cracking, and discoloration thereon even when exposed in the temperature higher than 700° C. for 2000 hours.

BRIEF DESCRIPTION OF THE DRAWING

The present invention will become more fully understood from the detailed description given hereinbelow and accompanying drawing which is given by way of illustration only, and thus are not limitative of the present invention and wherein.

DETAILED DESCRIPTION OF PREFERED EMBODIMENTS

Figure 1:
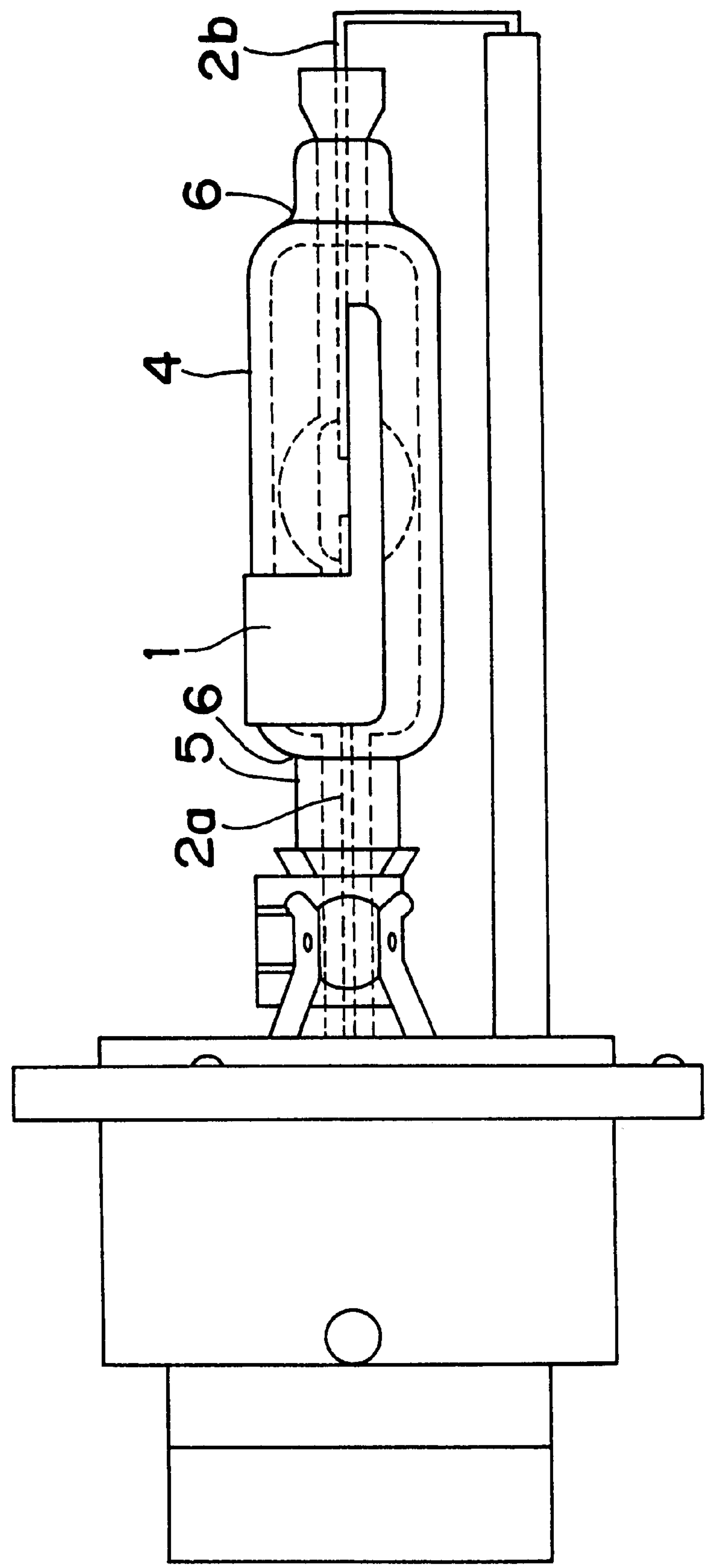
FIG. 1 shows a structure of the discharge lamp of the D2R type automobiles.

The paint for the shielding coat membrane comprises solid components of the black colorant and polycrystalline silica, and granulated glass as a binder in melting. Also a water-soluble resign is used for a binder after dried in a room temperature, and water is used for a solvent. The invention will be disclosed in detail hereinafter.

Mn-doped ferric oxide is used for the black oxide colorant, which compound is a black powder and shows excellent heat resistibility and weather resistibility. As described above, the shielding coat membrane for the discharge lamp is heated up to 700° C. when the lamp glows, it is desired not to be decolorized and pealed off during its life time of 2000 hours. If the discoloration occurs, the light absorption ratio changes to influence the lamp dispersing a lot.

A chemical formula of Mn-doped ferric oxide can be represented by $(Fe_{1-x}Mn_x)_2O_3$, especially the compound having the suffix x in a range of $0.05<x<0.4$ is black and has good heat resistibility. Mn-doped ferric oxide may be obtained by spreading a ferric hydroxide in the water, adding a manganese hydroxide into the water, and heating them sintered.

However, as well as the other black oxide colorants, Mn-doped ferric oxide does not have a good wettability with the melting granulated glass, so that the membrane strength tends to show weaker.

For this reason, polycrystalline silica is included therein. Since the polycrystalline silica has a very good wettability with the melting granulated glass, it is recognized that the membrane strength can be very much improved.

Since the high-grade single crystal or the amorphous silica has a low transmissivity, they are inappropriate for materials for the shielding coat membrane. However, it is recognized that the polycrystalline silica of a low transmissivity which is combined with the black colorant of Mn-doped ferric oxide provides the membrane with excellent membrane strength and shielding characteristics.

The granulated glass performs as a binder. The granulated glass is melted in sintering, the black colorant and the particle of the polycrystalline silica are bound with the outer glass so as to form the shielding coat membrane.

The granulated glass is made of at least two species selected from the group consisting of silica, boron oxide, and aluminum oxide. When the granulated glass contain the elements which chemically reacts with the colorant, such chemical reaction continues to result the discoloration and pealing-off of the shielding coat membrane while the lamp growing. For this reason, the granulated glass contains the above-mentioned material that inhibits the chemical reaction with Mn-doped ferric oxide.

Further preferably the granulated glass with the softening temperature in a range of 600° C. through 1400° C. is used and sintered at the temperature in a range of 900° C. through 1800° C. so that the shielding coat membrane with good membrane strength is obtained even after the light glows for 2000 hours.

A methyl cellulose or a vinyl alcohol is used as the water-soluble resign. After painted and provisionally dried, the shielding coat membrane is formed on the glass surface by use of the methyl cellulose, the vinyl alcohol or the acrylic performs as the binder. Also since the methyl cellulose functions to suppress the precipitation, the aggregation, and the separation of the colorant particles of the paint, the paint can be stabilized by adding the 0.2 through 2 doses of the methyl cellulose against 100 doses of the particles of the paint. When the weight ratio of solid components against the total paint is more than 40% by weight, the paint shrinkage and the paint drop can be prevented after painted so that the shielding coat membrane can be accurately patterned.

The methyl cellulose, the vinyl alcohol or the acrylic resign can not remain in the shielding coat membrane because of the pyrolysis when sintering.

Further as it can be sintered faster using a gas burner rather than the electric furnace as sintering means, the productivity is also improved because of short time-treatment.

The lamps with the shielding coat membrane according to the present invention obtained as above described, are manufactured by painting the paint for the shielding coat membrane in an arbitrary figure on the surface of the outer tube, and sintering them.

Next, an embodiment according to the present invention is explained hereinafter.

(Embodiment 1)

A predetermined amount of Mn-doped ferric oxide, polycrystalline silica, and the granulated glass mostly made of silica and boron oxide of which softening temperature is 700° C. are weighted. Mn-doped ferric oxide is used of which chemical formula is represented by $(Fe_{1-x}Mn_x)_2O_3$, wherein x=0.2. The total weight of the above-mentioned solid components is 450 g.

Next 300 g of water containing 3% by weight of the methyl cellulose is weighted and mixed with the above-mentioned admixture within a fast disperser. And the particles are dispersed in the water using the fast disperser with the marginal speed more than 5 m/s so as to obtain the paint for the shielding coat membrane.

The paint produced as described above is painted using a painting machine with an arbitrary pattern as desired on the surface of the outer tube of the discharge lamp, dried at the room temperature, and then sintered by a gas burner at the temperature of 1000° C. for several seconds, thereby completing the discharge lamp with the shielding coat membrane.

Table 1 through table 5 show many test results for several composition rates of the solid components in the shielding coat membrane.

TABLE 1

| composition rate of granulated glass: 3 wt % | | | | | | | |
|---|---|---|---|---|---|---|---|
| Black colorant | 100 wt % | 90 wt % | 80 wt % | 60 wt % | 40 wt % | 20 wt % | 10 wt % |
| Polycrystalline silica | 0 wt % | 10 wt % | 20 wt % | 40 wt % | 60 wt % | 80 wt % | 90 wt % |
| membrane's strength and adhesive | NG | NG | NG | NG | NG | NG | NG |
| Light transmissivity | OK | OK | OK | OK | OK | OK | NG |
| Discoloration after glowing | OK | OK | OK | OK | OK | OK | OK |
| pealing off, crack after glowing | NG | NG | OK | OK | OK | OK | OK |

TABLE 2

| composition rate of granulated glass: 5 wt % | | | | | | | |
|---|---|---|---|---|---|---|---|
| Black colorant | 100 wt % | 90 wt % | 80 wt % | 60 wt % | 40 wt % | 20 wt % | 10 wt % |
| Polycrystalline silica | 0 wt % | 10 wt % | 20 wt % | 40 wt % | 60 wt % | 80 wt % | 90 wt % |
| membrane's strength and adhesive | NG | NG | OK | OK | OK | OK | OK |
| Light transmissivity | OK | OK | OK | OK | OK | OK | NG |
| Discoloration after glowing | OK | OK | OK | OK | OK | OK | OK |
| pealing off, crack after glowing | NG | NG | OK | OK | OK | OK | OK |

TABLE 3

| composition rate of granulated glass: 10 wt % | | | | | | | |
|---|---|---|---|---|---|---|---|
| Black colorant | 100 wt % | 90 wt % | 80 wt % | 60 wt % | 40 wt % | 20 wt % | 10 wt % |
| Polycrystalline silica | 0 wt % | 10 wt % | 20 wt % | 40 wt % | 60 wt % | 80 wt % | 90 wt % |
| membrane's strength and adhesive | NG | NG | OK | OK | OK | OK | OK |
| Light trans-missivity | OK | OK | OK | OK | OK | OK | NG |
| Discoloration after glowing | OK | OK | OK | OK | OK | OK | OK |
| pealing off, crack after glowing | NG | NG | OK | OK | OK | OK | OK |

TABLE 4

| composition rate of granulated glass: 20 wt % | | | | | | | |
|---|---|---|---|---|---|---|---|
| Black colorant | 100 wt % | 90 wt % | 80 wt % | 60 wt % | 40 wt % | 20 wt % | 10 wt % |
| Polycrystalline silica | 0 wt % | 10 wt % | 20 wt % | 40 wt % | 60 wt % | 80 wt % | 90 wt % |
| membrane's strength and adhesive | NG | NG | OK | OK | OK | OK | OK |
| Light trans-missivity | OK | OK | OK | OK | OK | OK | NG |
| Discoloration after glowing | OK | OK | OK | OK | OK | OK | OK |
| pealing off, crack after glowing | NG | NG | OK | OK | OK | OK | OK |

TABLE 5

| composition rate of granulated glass: 25 wt % | | | | | | | |
|---|---|---|---|---|---|---|---|
| Black colorant | 100 wt % | 90 wt % | 80 wt % | 60 wt % | 40 wt % | 20 wt % | 10 wt % |
| Polycrystalline silica | 0 wt % | 10 wt % | 20 wt % | 40 wt % | 60 wt % | 80 wt % | 90 wt % |
| membrane's strength and adhesive | NG | NG | OK | OK | OK | OK | OK |
| Light trans-missivity | OK | OK | OK | OK | OK | OK | NG |
| Discoloration after glowing | OK | OK | OK | OK | OK | OK | OK |
| pealing off, crack after glowing | NG | NG | NG | NG | NG | NG | NG |

The composition rate of the granulated glass in Table 1, Table 2, Table 3, Table 4, and Table 5 are 3%, 5%, 10%, 20%, 25% by weight, respectively. The composition rate means the ratio representing the weight of the granulated glass against that of the total solid components.

The amount of Mn-doped ferric oxide and polycrystalline silica equal the total amount of the solid components except the granulated glass. Details and results for several tests are shown hereinafter.

Tests for the membrane strength and the membrane adhesive are conducted under "the guideline for the painted membrane of the automobile components". They are evaluated by the grid tape method described in the section 8.5.2 in the Japanese Industrial Standard (JIS) 5400 and by the pencil test with a pencil of 9H.

When both of the tests reveals that the membrane is not damaged, the membrane is determined as passed (OK). And when the membrane is damaged to expose the ground of the glass, then the membrane is determined as failed (NG).

Next, the test method of light transmissivitty is described below. First the light intensity without the shielding coat membrane is measured. After forming the shielding coat membrane, then again the light intensity with the shielding coat membrane is measured to compare with the former one without the shielding coat membrane so that the light transmissivity by percentage are calculated.

When the transmissivity is under 0.5% as described in the European uniformed standard for the D2R lamps, the membrane is determined as passed (OK). And when the transmissivity is more than 0.5%, the membrane is determined as failed (NG).

Next, the test method for the membrane discoloration is described below. Prior to the light glowing, the Lab value indicating to the color of the shielding coat membrane is measured by the chromaticity instrument. And the color is again measured at the same position after the light glows for 2000 hours, and ΔEab is calculated.

When the ΔEab is under 1.5, the membrane is determined as passed (OK), when the ΔEab is 1.5 or more, then the membrane is determined as failed (NG). This is because when the ΔEab is over 1.5, the light transmissivity greatly changes so that the light dispersion disadvantageously changes a lot.

As for cracking and pealing-off, when nothing unusual is observed through a microscope after the light glows for 2000 hours, the membrane is then determined as passed (OK), and when the very minor irregularity is found, the membrane is determined as failed (NG).

For the use as the shielding coat membrane for the D2R lamps, it is necessary to pass all of the above tests.

From the test results shown in Table 1 through Table 5, it is recognized that 5% through 20% by weight of the granulated glass is appropriate. It is recognized that when the granulated glass is under 5% by weight, the absolute amount of the binder is so small that the membrane strength and the membrane adhesive are not enough. And it is also recognized that when the granulated glass is over 20% by weight, cracking and pealing-off easily occur while the membrane strength and the membrane adhesive are good. This is because as the amount of the granulated glass increases, the thermal expansion rate of the shielding coat membrane is close to one of the granulated glass itself but the difference of the thermal expansion rate between the outer tube of quartz glass and one of the shielding coat membrane is expanded.

Further from the test results shown in Table 1 through Table 5, it is recognized that solid components except the granulated glass appropriately comprises 80% through 20% by weight of Mn-doped ferric oxide and 80% through 20% by weight of polycrystalline silica. It is realized that when the amount of Mn-doped ferric oxide is over 80% by weight, the wettability between the melting granulated glass and Mn-doped ferric oxide is so poor that the membrane strength and the membrane adhesive are not enough, and when the amount of Mn-doped ferric oxide is under 20% by weight, the light transmissivity is so high that the membrane is determined as failed.

(Embodiment 2)

In the embodiment 1, the granulated glass with softening temperature of 700° C. is sintered at the temperature of 1000° C. for several seconds. With respect to the embodiment 2, the test results are explained as for the relation between the softening temperature and the sintering temperature. Seven types of the granulated glasses with seven different levels of the softening temperature from 500° C. through 1600° C. are sintered at the six different sintering temperature. The test results are shown in Table 6. During those tests, the granulated glass is contained 10% by weight and the solid components except the granulated glass comprises 50% by weight of Mn-doped ferric oxide and 50% by weight of polycrystalline silica.

TABLE 6

| | sinter 800° C. | sinter 900° C. | Sinter 1000° C. | Sinter 1400° C. | Sinter 1800° C. | Sinter 2000 |
|---|---|---|---|---|---|---|
| Softening Temp 500° C. | NG | NG | NG | NG | NG | NG |
| Softening Temp 500° C. | NG | OK | OK | OK | OK | NG |
| Softening Temp 500° C. | NG | NG | OK | OK | OK | NG |
| Softening Temp 500° C. | NG | NG | NG | OK | OK | NG |
| Softening Temp 500° C. | NG | NG | NG | OK | OK | NG |

TABLE 6-continued

| | sinter 800° C. | sinter 900° C. | Sinter 1000° C. | Sinter 1400° C. | Sinter 1800° C. | Sinter 2000 |
|---|---|---|---|---|---|---|
| Softening Temp 500° C. | NG | NG | NG | NG | OK | NG |
| Softening Temp 500° C. | NG | NG | NG | NG | NG | NG |

Table 6 shows the results for the tests similarly conducted as the Table 1 through Table 5. If some problems are observed, then the membrane is determined as failed. From the test results in Table 6, it is recognized that the softening temperature is appropriate in a range of 600° C. through 1400° C. and the granulated glasses with the softening temperature under 600° C. causes cracking and pealing-off of the membrane after the light glows for 2000 hours. This is the reason as described above, because the shielding coat membrane is heated up to 700° C. in glowing light.

And when the softening temperature is more than 1400° C., the membrane has to be sintered at the temperature more than 2000° C. This is not desirable because the outer tube of the lamp is damaged with heat so that the lifetime of the lamp is shortened, if the lamp is sintered at the temperature of 2000° C.

It is recognized that the desirable sintering temperature is, dependent upon the softening temperature, in a range 900° C. through 1800° C.

(Embodiment 3)

Next, the membranes are evaluated, which include Mn-doped ferric oxide $(Fe_{1-x}Mn_x)_2O_3$ wherein the x varies from 0.03 through 0.5.

The test results are shown in the Table 7. Since the level of the discoloration is most influenced when the x varies, the discoloration is tested after 2000 hours glowing.

TABLE 7

| X | discoloration after 2000 hours |
|---|---|
| 0.03 | NG |
| 0.05 | OK |
| 0.1 | OK |
| 0.2 | OK |
| 0.3 | OK |
| 0.4 | OK |
| 0.5 | NG |

In those tested membranes, the granulated glass with the softening temperature of 700° C. which is sintered at the sintering temperature of 1000° C. is contained 10% by weight, the solid components except the granulated glass comprises 50% by weight of Mn-doped ferric oxide and 50% by weight of polycrystalline silica.

From the results shown in Table 7, it is understood that the suffix x is appropriate in a range from 0.05 through 0.4. The granulated glass including $(Fe_{1-x}Mn_x)_2O_3$, wherein the suffix x is under 0.05, contains too little manganese to use it because its color is red. The granulated glass including $(Fe_{1-x}Mn_x)_2O_3$, wherein the suffix x is over 0.4, is considered unstable to chemically react and generate the other compounds during light glowing so that the discoloration occurs. (Effects of the invention)

As described above, the paint for the shielding coat membrane according to the present invention comprises the solid components including Mn-doped ferric oxide, polycrystalline silica, and the granulated glass mostly made of silica and boron oxide, so that the obtained shielding coat membrane is excellent in the view point of the membrane strength, the light transmissivity, the discoloration, and the suppression of pealing-off and cracks. Especially its wettability in melting with the granulate glass, as well as the membrane strength, can be very much improved in comparison with the conventional one by mixing polycrystalline silica therein.

Further the process for manufacturing the lamp with the shielding coat membrane according to the present invention, comprises steps of painting the above mentioned paint for the shielding coat membrane on the lamp surface and sintering so as to form the shielding coat membrane, thereby to obtain the lamp with the shielding coat membrane that pass all tests for the above evaluations even after the light glows for 2000 hours.

What is claimed is:

1. A paint for a shielding coat membrane for a discharge lamp comprising polycrystalline silica and Mn-doped ferric oxide, and a granulated glass mostly made of silica, wherein solid components in said paint include 5–20 wt % granulated glass and 80–95 wt % of a mixture of 20–80 wt % polycrystalline silica and 20–80 wt % Mn-doped ferric oxide.

2. A paint according to claim 1, wherein a chemical formula of said Mn-doped ferric oxide can be represented by $(Fe_{1-x}Mn_x)_2O_3$, said suffix x being in a range of 0.05<x<0.4.

3. A paint according to claim 1, wherein said granulated glass is made of at least two species selected from the group consisting of silica, boron oxide, and aluminum oxide, and has a softening temperature in a range of 600° C. through 1400° C.

4. A lamp comprising a shielding coat membrane formed on a surface of said lamp by painting a paint thereon, said paint including polycrystalline silica, Mn-doped ferric oxide, and a granulated glass mostly made of silica.

5. A lamp according to claim 4, wherein solid components in said paint include 5–20 wt % granulated glass and 80–95 wt % of a mixture of 20–80 wt % polycrystalline silica and 20–80 wt % Mn-doped ferric oxide.

6. A lamp according to claim 4, wherein a chemical formula of said Mn-doped ferric oxide can be represented by $(Fe_{1-x}Mn_x)_2O_3$, said suffix x being in a range of 0.05<x<0.4.

7. A lamp according to claim 4, wherein said granulated glass is made of at least two species selected from the group consisting of silica, boron oxide, and aluminum oxide, and has a softening temperature in a range of 600° C. through 1400° C.

8. A process for manufacturing a lamp comprising:

painting a paint including polycrystalline silica, Mn-doped ferric oxide, and a granulated glass mostly made of silica, on a surface of said lamp; and sintering said lamp so as to form a shielding coat membrane.

9. A process according to claim 8, further comprising:

sintering said shielding coat membrane at a temperature in a range of 900° C. through 1800° C. using a gas burner.

10. A process according to claim 8, wherein solid components in said paint include 5–20 wt % granulated glass and 80–95 wt % of a mixture of 20–80 wt % polycrystalline silica and 20–80 wt % Mn-doped ferric oxide.

11. A process according to claim 8, wherein a chemical formula of said Mn-doped ferric oxide can be represented by $(Fe_{1-x},Mn_x)_2O_3$, said suffix x being in a range of 0.05<x<0.4.

12. A process according to claim 8, wherein said granulated glass is made of at least two species selected from the group consisting of silica, boron oxide, and aluminum oxide, and has a softening temperature in a range of 600° C. through 1400° C.

13. A process according to claim 9, wherein solid components in said paint include 5–20 wt % granulated glass and 80–95 wt % of a mixture of 20–80 wt % polycrystalline silica and 20–80 wt % Mn-doped ferric oxide.

14. A process according to claim 9, wherein a chemical formula of said Mn-doped ferric oxide can be represented by $(Fe_{1-x}Mn_x)_2O_3$, said suffix x being in a range of 0.05<x<0.4.

15. A process according to claim 9, wherein said granulated glass is made of at least two species selected from the group consisting of silica, boron oxide, and aluminum oxide, and has a softening temperature in a range of 600° C. through 1400° C.

* * * * *